(12) United States Patent
Gashus

(10) Patent No.: US 6,185,264 B1
(45) Date of Patent: Feb. 6, 2001

(54) APPARATUS AND METHOD FOR FREQUENCY SHIFT KEYING

(76) Inventor: Ove Kris Gashus, 6160 Regina Terrace, Halifax, N.S. (CA), B3G 1N5

(*) Notice: Under 35 U.S.C. 154(b), the term of this patent shall be extended for 0 days.

(21) Appl. No.: 08/992,256

(22) Filed: Dec. 17, 1997

(51) Int. Cl.$^7$ .............. H03C 3/00; H03K 7/06; H04L 27/12
(52) U.S. Cl. .......................... 375/303; 375/272
(58) Field of Search .................. 375/303, 334; 327/394, 553

(56) References Cited

U.S. PATENT DOCUMENTS

| | | | |
|---|---|---|---|
| 2,905,835 | | 9/1959 | Wray .................. 307/88.5 |
| 2,930,991 | | 3/1960 | Edwards ............... 331/117 |
| 2,989,624 | * | 6/1961 | Jacob .................. 455/110 |
| 3,114,117 | * | 12/1963 | Anderson ............. 331/141 |
| 3,205,441 | * | 9/1965 | Likel .................. 375/303 |
| 3,222,619 | | 12/1965 | Hekimian ............. 331/179 |
| 3,249,896 | | 5/1966 | Baker .................. 332/14 |
| 3,257,508 | * | 6/1966 | Crafts et al. ......... 375/280 |
| 3,363,204 | | 1/1968 | Kageyama et al. ..... 334/47 |
| 3,451,012 | | 6/1969 | Spiro .................. 332/18 |
| 3,510,803 | * | 5/1970 | Jacobson et al. ..... 332/102 |
| 3,525,054 | | 8/1970 | Denney ................ 331/49 |
| 3,534,294 | | 10/1970 | Auer ................... 331/117 |
| 3,614,624 | * | 10/1971 | Scarpino ............. 375/303 |
| 3,719,779 | * | 3/1973 | Wilson ................ 375/272 |
| 3,904,966 | * | 9/1975 | Firman ................ 375/304 |
| 3,918,057 | | 11/1975 | Van Tol .............. 343/6.8 |
| 4,454,485 | | 6/1984 | Fisher ................ 331/109 |
| 4,596,022 | * | 6/1986 | Stoner ................ 375/272 |
| 4,682,344 | * | 7/1987 | Somer ................ 375/303 |
| 4,769,612 | * | 9/1988 | Tamakoshi et al. ... 327/554 |
| 5,016,259 | * | 5/1991 | Hershberger ......... 375/296 |
| 5,030,928 | * | 7/1991 | Ho .................... 332/102 |
| 5,168,179 | * | 12/1992 | Negahban-Hagh ...... 327/554 |
| 5,300,904 | | 4/1994 | Andersen ............. 334/55 |
| 5,491,453 | * | 2/1996 | Ichihara ............. 327/553 |
| 5,497,166 | * | 3/1996 | Rapeli ................ 327/337 |
| 5,497,399 | * | 3/1996 | Ito .................... 375/271 |
| 5,532,654 | * | 7/1996 | Ieki et al. .......... 332/102 |

FOREIGN PATENT DOCUMENTS

| 0489544 | * | 6/1992 | (EP) .................. 27/20 |
|---|---|---|---|
| 1093538 | * | 12/1967 | (GB) .................. 03/12 |

* cited by examiner

Primary Examiner—Stephen Chin
Assistant Examiner—Thomas E McKiernan
(74) Attorney, Agent, or Firm—Ridout & Maybee

(57) ABSTRACT

A transmitter for generating and transmitting frequency shift keying signals. The transmitter comprises a resonant circuit, a capacitor, a switch for coupling and decoupling the capacitor to the resonant circuit, a sensor and a controller. The controller includes an input for receiving a data signal. The controller actuates the switch to selectively couple the capacitor to the resonant circuit based on the state of the data signal. The sensor determines when the energy level in the capacitor is substantially zero and the controller synchronizes actuation of the switch with the substantially zero energy state of the capacitor. The transmitter also includes a circuit for efficiently supplying power to the resonant circuit in form the power pulses.

12 Claims, 4 Drawing Sheets

APPARATUS AND METHOD FOR FREQUENCY SHIFT KEYING

FIELD OF THE INVENTION

The present invention relates to an apparatus and method for generating electromagnetic frequency shift keying signals.

BACKGROUND OF THE INVENTION

Frequency shift keying (FSK) transmitters convert incoming baseband binary data signals into corresponding frequency changes of an electromagnetic carrier signal. The modulated carrier signal is then decoded by a receiver into the original baseband binary data signals.

FSK transmitters typically include a resonant circuit which oscillates at the carrier frequency. Inductive reactive or capacitive reactive circuit elements are coupled to the resonant circuit through electronic switches. To achieve the frequency shifts of the carrier signal, the electronic switches selectively connect the reactive circuit elements to, and disconnect the reactive circuit elements from, the resonant circuit in response to the baseband binary data signals.

Conventional FSK transmitters introduce voltage transients, or "jitter", into the modulated carrier signal when the carrier frequency is shifted. These transients are attributable to the asynchronous nature of the baseband binary data signals with respect to the carrier signal. Since the transmitter can be required to shift frequencies at any given moment, transients are introduced into the carrier signal if the initial conditions of the switched reactive circuit elements do not match the circuit conditions existing in the resonant circuit at the instant of the frequency shift.

Such voltage transients can be troublesome, particularly at high data transmission rates, because the transients can cause the receiver to produce bit errors in decoding the baseband data. Further errors can be introduced from the power source driving the resonant circuit if the magnitude of the carrier signal is allowed to fluctuate. Accordingly, it is desirable to eliminate both transients introduced into the carrier signal, and variations in magnitude of the carrier signal. It is also desirable, particularly where energy sources are limited, for the transfer of energy between the power source and the electromagnetic carrier signal to be as efficient as possible.

Various attempts have been made to eliminate frequency shift distortion from transients. For example, Baker (U.S. Pat. No. 3,249,896), Spiro (U.S. Pat. No. 3,451,012) and Andersen (U.S. Pat. No. 5,300,904) teach FSK transmitters each using a pair of magnetically-coupled inductors which are alternately coupled to a capacitor through a switch. Distortion introduced when the capacitor is switched from one inductor to the other is minimized since the magnetic fields in both inductors are continuously in phase. However, the cost of magnetically-coupled inductors unnecessarily increases the cost of the circuits. Furthermore, the circuits are inefficient since two magnetic fields must be continually maintained, even though only one is used to generate the modulated carrier signal at any given time.

Hekimian (U.S. Pat. No. 3,222,619) teaches a frequency shift keying generator comprising a resonant circuit coupled to a capacitor through the parallel combination of a switch and an amplifier. When the switch is open, the capacitance C of the capacitor appears to the resonant circuit as C/B, B being the gain of the amplifier. When the switch is closed, the capacitance C appears to the resonant circuit as C. Distortion introduced when the capacitor is switched is minimized by selecting an amplifier having unity voltage gain. However, as voltage gain can fluctuate with temperature and frequency, in practice distortion may be introduced nevertheless.

Kageyama (U.S. Pat. No. 3,363,204) teaches a frequency shift oscillator having a switch which selectively connects an inductor and a capacitor to a resonant circuit. Distortion introduced when the inductor and capacitor are switched is minimized by selecting the values of the components such that the characteristic impedance of the circuit in both modes is identical. However, as the reactance of the components can vary with temperature and the age of the components, in practice the characteristic impedance may not always be identical.

Accordingly, there remains a need for a frequency shift keying signal transmitter which allows for frequency shifts to occur in the carrier signal without inducing transients from the switching action, and which also utilizes a highly efficient energy transfer between the power source and the modulated magnetic fields.

SUMMARY OF THE INVENTION

The present invention provides a frequency shift keying signal transmitter which allows for frequency shifts to occur in the carrier signal without inducing voltage transients in the carrier signal from the switching action. The frequency shift keying transmitter also features a highly efficient energy transfer between the power source and the modulated magnetic fields.

In a first aspect the present invention provides a frequency shift keying generator comprising: (a) a resonant circuit; (b) a reactive element; (c) a switch for coupling and decoupling said reactive element to and from said resonant circuit, said resonant circuit oscillating at a first frequency when said reactive element is coupled and said resonant circuit oscillating at a second frequency when said reactive element is uncoupled; (d) a power supply having an output port coupled to said resonant circuit, said power supply including means responsive to a control signal for enabling said output port for energizing said resonant circuit; (e) a detector coupled to said resonant circuit for detecting an energy level for said reactive element and producing an output signal indicative of said energy level; and (f) a controller for controlling said switch, said controller including an output port for actuating said switch and an input port coupled to said detector for receiving said energy level output signal, said controller also having a data input for receiving a data signal and means for selectively actuating said switch to shift the oscillation of said resonant circuit between said first and second frequencies in response to a change of state in the data signal, and said controller including means responsive to said energy level for synchronizing the actuation of said switch with the energy level in said reactive element.

In a second aspect, the present invention provides a method for producing frequency shift keying in an oscillating carrier signal, the oscillating carrier signal being generated by a resonant circuit having a modulating capacitor and a switch for selectively coupling and decoupling the capacitor to the resonant circuit, said method comprising the steps of: (a) generating the oscillating carrier signal at a given frequency; (b) receiving a binary data signal comprising a sequence of binary states; (c) monitoring the energy level in the modulating capacitor; (d) introducing a shift in the frequency of said oscillating carrier signal when there is a change in the binary state of the data signal; (e) wherein said step of introducing a frequency shift comprises selectively coupling the modulating capacitor to the resonant circuit and wherein said step of coupling is synchronized to the monitored energy level in the modulating capacitor.

In another aspect, the present invention provides a frequency shift keying generator comprising: (a) a resonant circuit; (b) a reactive element; (c) a switch for coupling and decoupling said reactive element to and from said resonant circuit, said resonant circuit oscillating at a first frequency when said reactive element is coupled and said resonant circuit oscillating at a second frequency when said reactive element is uncoupled; (d) a power supply having an output port coupled to said resonant circuit, said power supply including means responsive to a control signal for enabling said output port for energizing said resonant circuit; (e) a sensor coupled to said resonant circuit, said sensor including means for sensing current flow in said resonant circuit and means for generating an output signal indicative of the current flow; (f) a controller for controlling said switch, said controller including an output port for actuating said switch and a data input for receiving a data signal and means for selectively actuating said switch to shirt the oscillation of said resonant circuit between said first and second frequencies in response to a change of state in the data signal, and said controller including means responsive to said current flow signal for generating said control signal for enabling said output port and coupling said power supply to said resonant circuit for a predetermined duration when the current flow is substantially zero, so that energy is injected into said resonant circuit when said output port is enabled.

BRIEF DESCRIPTION OF THE DRAWINGS

Reference will now be made to the accompanying drawings which show, by way of example, preferred embodiments of the invention, and in which.

DETAILED DESCRIPTION OF THE PREFERRED EMBODIMENTS

Figure 1:
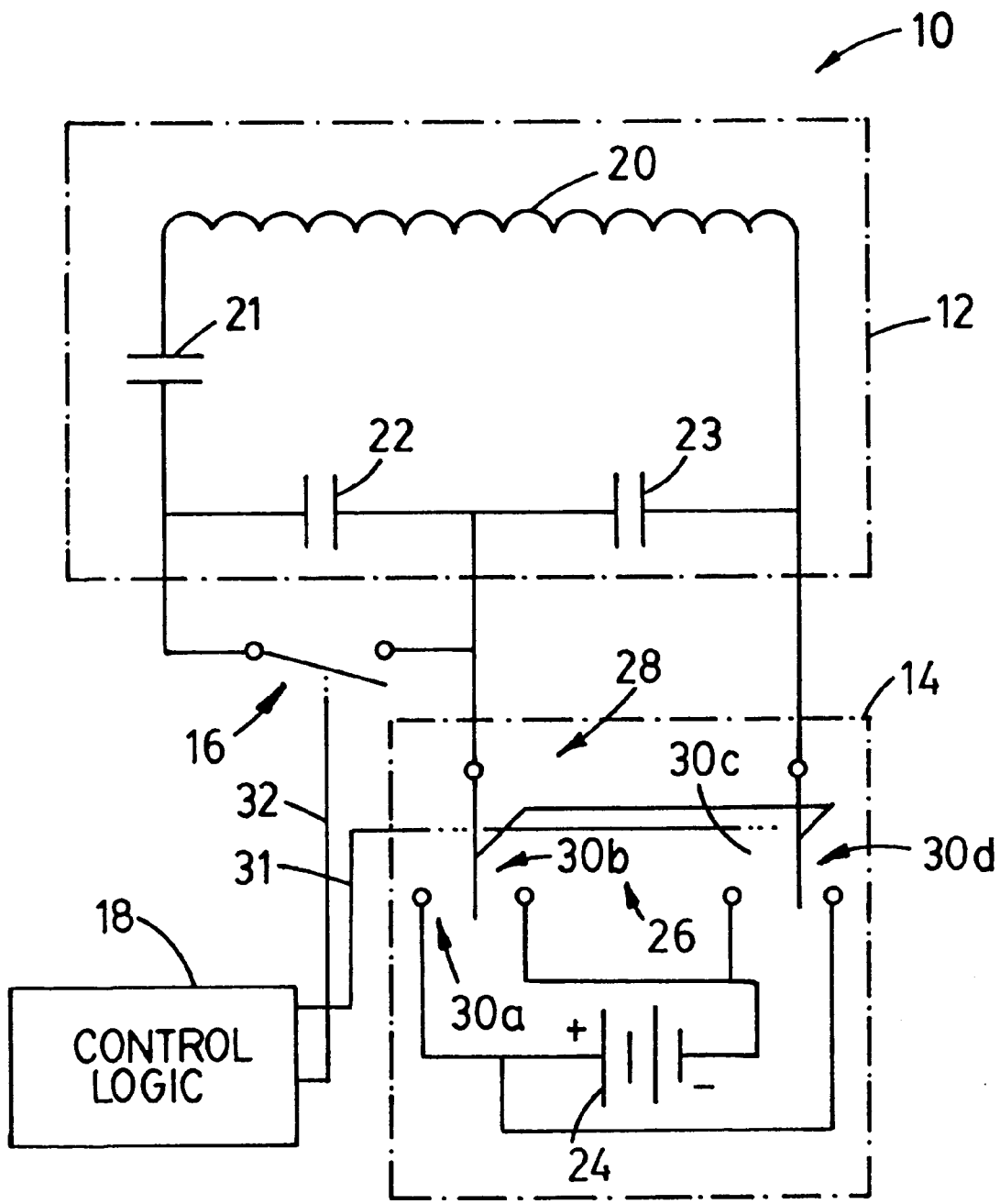
FIG. 1 shows in block diagram a frequency shift keying transmitter according to the present invention.

Reference is first made to FIG. 1, which shows a frequency shift keying (FSK) transmitter 10 according to the present invention. The FSK transmitter 10 comprises an antenna circuit 12, a power supply circuit 14, a modulation control switch 16, and control logic 18.

The antenna circuit 12 comprises a coil 20, a main capacitor 21, a modulation capacitor 22, and a pump capacitor 23. The coil 20 comprises an antenna and provides the radio signal output for the transmitter 10. As shown in FIG. 1, the coil is connected in series to the main capacitor 21 and the coil 20 together with the capacitor 21 are connected in parallel to the two capacitors 22 and 23 which are connected in series. The antenna coil 20 together with the three capacitors 21 to 23 form a parallel resonant LC circuit. The capacitors 21 to 23 are selected to provide the necessary capacitance, voltage and current ratings as mandated by the application for the transmitter 10. Preferably, the antenna circuit 12 will have a high Q value.

The power supply circuit 14 comprises a voltage source 24, a bridge network 26, and an output port 28. The voltage source 24 preferably comprises a high voltage DC source. The bridge 26 comprises four switching elements 30, indicated individually as 30a, 30b, 30c and 30d. The switching elements 30 are connected to form a H-bridge. The switching elements 30 are actuated in pairs 30a/30c and 30b/30d by a control output 31 from the control logic 18. The output port 28 is coupled to the pump capacitor 23 and driven by the output from the H-bridge 26. The control logic 18 actuates the switching element pairs 30a/30c, 30b/30d in the H-bridge 26 to alternate the polarity of the output from the DC source 24 being applied to the pump capacitor 23.

The antenna circuit 12 being a resonant circuit will oscillate. The circuit 12 will continue to oscillate as long as the energy which is lost is replenished. The energy loss is primarily due to the power dissipated in the coil of the antenna 20. According to this aspect of the invention, the lost energy is replenished by supplying short pulses of high voltage to charge the pump capacitor 23. The pulses are supplied at precise intervals in the oscillatory cycle by controlling the switching elements 30. As will be described in more detail below, the pulses are applied to the pump capacitor 23 for a very short interval of time and at an instant when the voltage on the pump capacitor 23 is at or near its maximum value. This maintains the maximum positive or negative peak value of the voltage on the pump capacitor 23 at a constant value. As a result, the AC current in the pump capacitor 23 and therefore the antenna circuit 12 is forced to remain essentially constant. The energy delivered to the pump capacitor 23 in each switching period will be equal to the amount dissipated in the antenna circuit 23 over the interval between two successive switching periods.

As shown in FIG. 1, the modulation control switch 16 is connected across the modulating capacitor 22. The control logic 18 controls the actuation of the modulation control switch 16 with a control output 32. When the switch 16 is closed, the modulating capacitor 22 is shorted and removed from the resonant LC circuit 12. This effectively increases the amount of capacitance in the circuit 12, which in turn decreases the resonant frequency of the output signal from the antenna 20. Conversely, when the switch 16 is opened, the modulating capacitor 22 is coupled to the other two capacitors 21 and 23 and the capacitance in the circuit 12 decreases. The decrease in capacitance increases the resonant frequency of the output signal from the antenna 20. The changes in the frequency of the output signal from the antenna 20 provide the frequency key shifting. Modulation for frequency shift keying is accomplished by controlling the opening and closing of the modulating switch 16 based on the state or value of a binary data signal indicated generally by 99 in FIG. 3.

Figure 2:
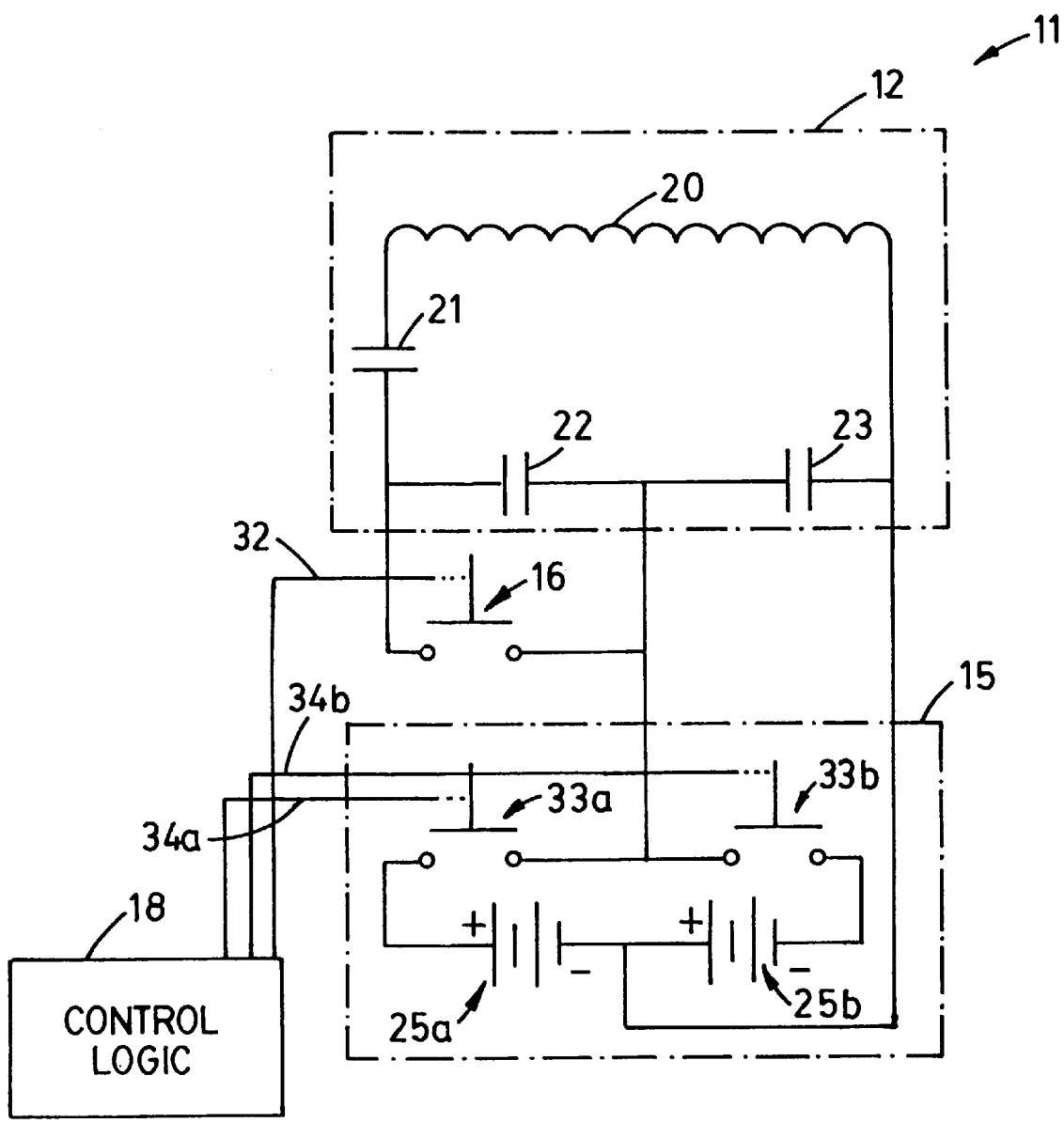
FIG. 2 shows in block diagram another embodiment of the frequency shift keying transmitter according to the present invention.

Reference is next made to FIG. 2 which shows a variation of the FSK transmitter indicated generally by 11. In FIGS. 1 and 2, like references indicate like elements. The FSK transmitter 11 includes a modified power supply circuit 15. The power supply circuit 15 includes two DC sources 25a, 25b and two switches 33a and 33b. The polarity of the voltage pulses applied to the pump capacitor 23 is controlled by closing one of the switches 33a, 33b. The actuation of the switches 33a, 33b is controlled by respective output lines 34a and 34b from the control logic 18.

Figure 3:
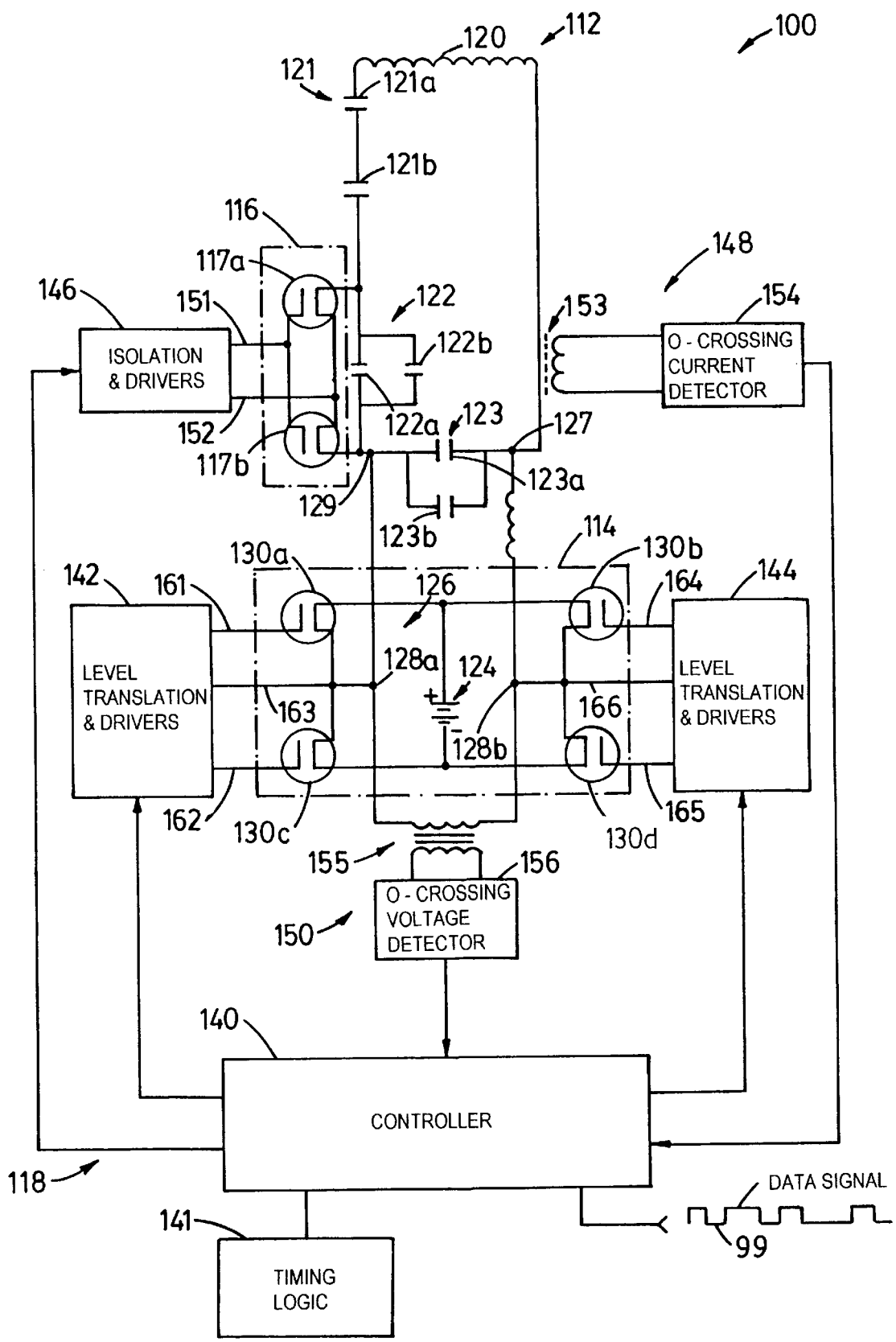
FIG. 3 is a schematic representation of an implementation of the frequency shift keying transmitter of FIG. 1.

Reference is next made to FIG. 3 which shows an implementation of a FSK transmitter 100 according to the present invention. The FSK transmitter 100 has a topology similar to the transmitter 10 shown in FIG. 1. The FSK transmitter 100 comprises an antenna circuit 112, a power supply circuit 114, a modulation control switch 116, and a control circuit 118.

The antenna circuit 112 comprises a coil 20, a main capacitor 121, a modulation capacitor 122, and a pump capacitor 123. The coil 120 comprises an antenna and provides the radio signal output for the transmitter 110. The coil or antenna 120 is connected in series to the main capacitor 121, and the coil 120 and capacitor 121 are connected in parallel to the capacitor 122 and 123 which are connected in series. The antenna coil 120 together with the three connected capacitors 121 to 123 from a parallel resonant LC cicuit. As shown in FIG. 3, the main capacitor 121 may be formed from multiple capacitors shown individually as 121a, 121b, . . . 121k (not shown). The modulation capacitor 122 may comprise a bank of capacitors shown individually as 122a, 122b, . . . 122n (not shown). The pump capacitor 123 may also comprise a bank of capacitors shown individually as 123a, 123b, . . . 123m (not shown). By grouping banks of capacitors, greater flexibility is provided for achieving the necessary capacitance, voltage and current ratings for the particular application.

The power supply circuit 114 comprises a high voltage source 124, a switching network 126, and an output port 128 formed by terminals 128a and 128b. The voltage source 24 comprises a high voltage DC source, for example, 125 VDC. The switching network 126 comprises four switching elements 130, indicated individually as 130a, 130b, 130c and 130d. The switching elements 130 comprise MOSFET transistors and are connected to form a H-bridge. The pump capacitor bank 123 is coupled to the output port at terminals 128a and 128b. The switching elements 130 may utilize other types of devices such as insulated-gate field-effect transistors or IGFET's. The selection of the particular device depends on the power and voltage levels for the design of the transmitter 10.

As shown in FIG. 3, the modulation control switch 116 comprises first and second enhancement-mode MOSFET transistors 117a and 117b. The gates of the MOSFET's 117a, 117b are tied together and coupled to a control output line 151 from the control circuit 118. The sources of the MOSFET's 117a, 117b are also tied together and coupled to another control output line 152 from the control circuit 118. The modulation control switch 116 is coupled across the modulating capacitor bank 122, with one terminal of the capacitor 122 being connected to the drain of the first MOSFET 117a and other terminal being connected to the drain of the second MOSFET 117b, The function of the modulation control switch 116 is to couple and decouple the modulating capacitor bank 122 from the antenna circuit 112 in response to control signals from the control circuit 118. When the two MOSFET's 117a, 117b are conducting or ON, the modulating capacitor bank 122 is effectively "shorted out".

As shown in FIG. 3, the control circuit 118 comprises a controller 140, MOSFET driver circuits 142, 144, 146, a zero-crossing current detector 148, and a zero-crossing voltage detector 150.

The controller 140 preferably comprises a micro controller which has been suitably programmed to execute the processing steps for controlling the FSK transmitter 100 according to the invention. A suitable device for the controller 140 is the S80C652 available from Signetics Corp. Advantageously, the controller 140 can be programmed to provide variable modulation timing.

The MOSFET driver circuits 142, 144, 146 interface the power output elements, i.e. the MOSFET's, which operate at high voltage and current levels to the controller 140. As shown in FIG. 3, the MOSFET driver circuit 142 interfaces the MOSFET's 130a and 130c to the controller 140. The driver circuit 142 comprises level translation and driver circuits, the implementation of which are within the knowledge of one skilled in the art. The driver circuit 142 includes an output 161 connected to the gate of the MOSFET 130a, an output 162 connected to the gate of the MOSFET 130c and an output 163 connected to the tied-together sources of the two MOSFET's 130a, 130c. The driver circuit 142 controls the actuation of the MOSFET's 130a and 130c in response to signals issued by the controller 140.

Similarly, the MOSFET driver circuit 144 interfaces the MOSFET's 130b and 130d to the controller 140. The driver circuit 144 also comprises level translation and driver circuits, and includes an output 164 connected to the gate of the MOSFET 130b, an output 165 connected to the gate of the MOSFET 130d and an output 166 connected to the tied-together sources of the two MOSFET's 130b, 130d. The driver circuit 144 controls the actuation of the MOSFET's 130b and 130d an output lines 164 to 166 in response to signals issued by the controller 140.

The MOSFET driver 146 interfaces the modulation control switch 116 to the controller 140. The driver circuit 146 comprises circuits for isolating and biasing the MOSFET's 117a and 117b which are floating at a high voltage. The implementation such circuits is conventional and within the knowledge of those skilled in the art. The driver circuit 146 includes the control output 151 which is connected to the tied-together gates of the two MOSFET's 117a and 117b, and the control output 152 which is connected to the tied-together source terminals. The driver circuit 146 controls the actuation of the modulation control switch 116, i.e. the MOSFET's 117a and 117b, in response to signals issued by the controller 140. When the MOSFET's 117a and 117b are turned ON, i.e. conducting, the modulating capacitor bank 122 is shorted out, and the total capacitance in the antenna circuit 112 increases. This, in turn, causes the resonant frequency of the output signal from the antenna 120 to decrease. When the MOSFET's 117a and 117b are turned OFF, i.e. non-conducting, the modulating capacitor bank 122 is connected in series with the main capacitor 121 and the pump capacitor bank 123 thereby decreasing the total capacitance in the antenna circuit 112. This, in turn, causes the resonant frequency in the circuit 112 to increase and results in a frequency key shift. The controller 140 controls the actuation of the modulating control switch 116 to convert a data signal 99 into frequency changes or shifts in the carrier signal emitted by the antenna.

The zero-crossing current detector 148 comprises a toroidal current transformer 153 and a sensing circuit 154. The current transformer 153 is magnetically coupled to the antenna coil 120. The sensing circuit 154 uses the output from the transformer 153 to determine when the current in the antenna circuit 112 is zero. This information is passed to the controller 140 and used in the timing control of the switching elements. The zero-crossing detector 148 is implemented using conventional techniques as will be within the knowledge of one skilled in the art.

The zero-crossing voltage detector 150 comprises a voltage transformer 155 and a zero-crossing voltage sensing circuit 156. The transformer 155 provides isolation between the high voltage antenna circuit 112 and the low voltage control circuit 118. The secondary winding of the transformer 155 is coupled across the pump capacitor bank 123 and the output port 128 from the power supply circuit 114. The voltage across the pump capacitor 123 is induced in the primary winding of the transformer 155 and the sensing circuit 156 uses the output from the primary to determine when the voltage across the pump capacitor bank 123 is zero. This information is utilized by the controller 140 to time the conduction of the MOSFET's 117a and 117b in the modulating control switch 116 in order to eliminate the development of a DC bias across the modulating capacitor bank 122. The timing also ensures that no transients are caused in the circuit 112 by the switching of the capacitor bank 122.

The control circuit 118 also includes timing logic 141. The timing logic provides the signals required by the various digital and analog circuits, typically as phase references and pulse width timing.

Figure 4:
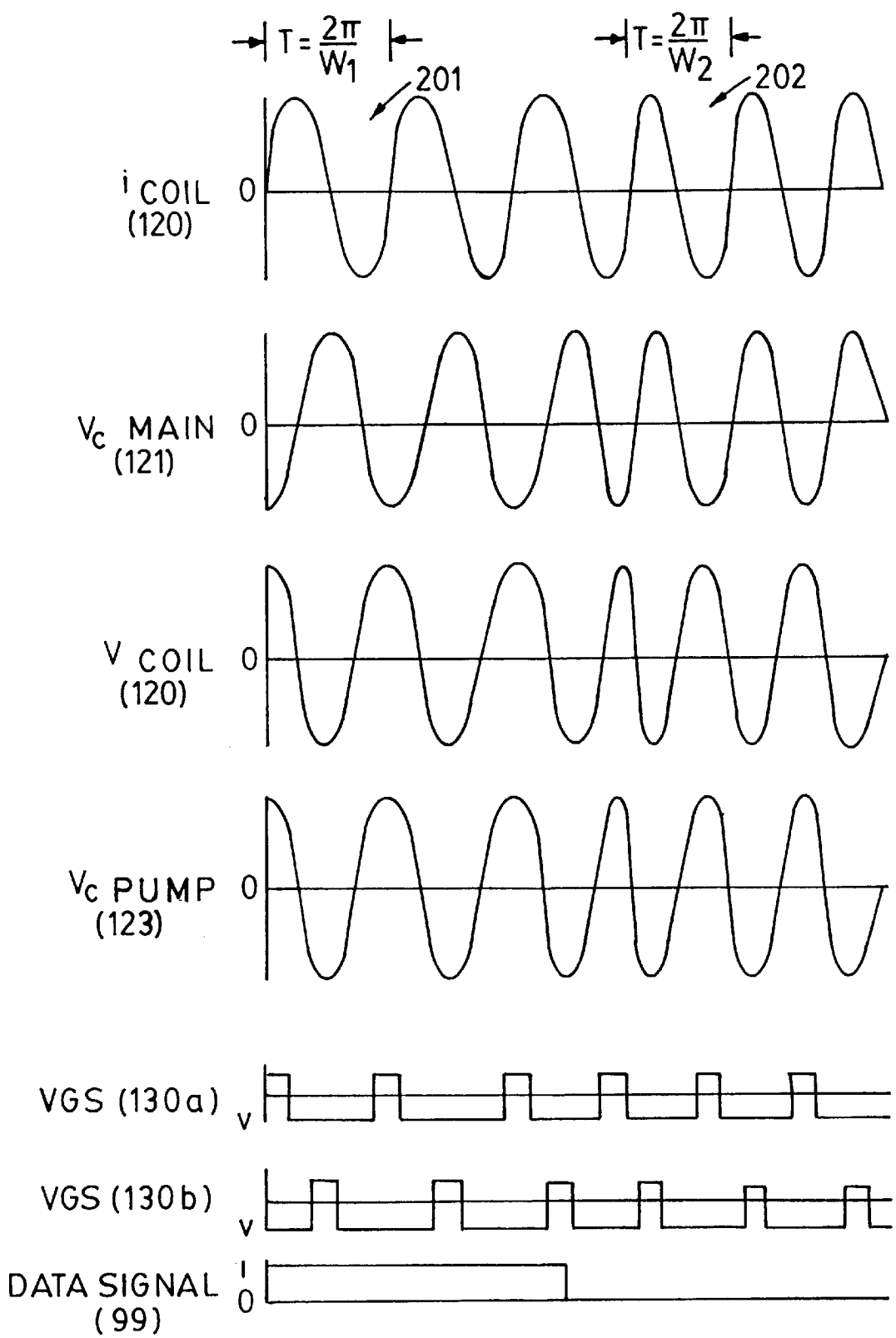
FIG. 4 is a timing diagram showing the timing of selected signals in the transmitter of FIG. 3.

Next the operation of the FSK transmitter 100 is described. Reference is also made to FIG. 4, which shows the relationship between selected signals in the FSK transmitter 100.

When the binary data signal 99 received by the controller 140 is in logic state ONE or HIGH, the corresponding voltage applied between the gates and source terminals (i.e. on output 151 and 152) of the MOSFET's 117a and 117b will be below the conduction voltage. As a result, the modulating capacitor bank 122 is not shorted and remains connected to the main capacitor 121 and the pump capacitor 123, and the antenna circuit 12 will oscillate at a radian frequency of approximately $$\omega 1 = \frac{1}{\sqrt{L\left(\frac{1}{C_{pump}} + \frac{1}{C_{main}} + \frac{1}{C_{modulation}}\right)}}$$

which is indicated by reference 201 in FIG. 4. While the antenna circuit 12 oscillates, the zero-crossing voltage detector 150 continuously senses the voltage drop across the pump capacitor 123. When the voltage drop across the pump capacitor 123 is zero, the detector 150 notifies the controller 140.

Since the modulating capacitor bank 122 is in series with the pump capacitor bank 123, the voltage drop measured by the voltage detector 150 will be proportional to the voltage drop across the modulating capacitor bank 122. As the energy stored in a capacitor is related to the voltage drop across the capacitor by the equation $$Ec = \frac{1}{2}CV^2,$$

it will be appreciated that the voltage drop measured by the voltage detector 150 will be indicative of the energy stored in the modulating capacitor bank 122. Therefore, in effect, the voltage detector 150 signals the controller 140 when the energy stored in the modulating capacitor 122 is zero.

When the data signal 99 changes from a logic HIGH to a logic ZERO, and the voltage detector 150 signals that the energy stored in the modulating capacitor bank 122 is zero, then the controller 140 issues control signals on outputs 151 and 152 to turn ON the two MOSFET's 117a and 117b in the modulation control switch 116. When the MOSFET's 117a and 117b are turned ON or conducting the modulating capacitor bank 122 is "shorted out" and effectively removed from the antenna circuit 112. As the antenna circuit 112 is oscillating at resonance, at this point substantially all the energy in the circuit 112 will be stored in the magnetic field of the antenna coil 120. With the modulating capacitor bank 122 shorted out, the antenna circuit 112 will oscillate at a radian frequency of approximately $$\omega 2 = \frac{1}{\sqrt{L\left(\frac{1}{C_{pump}} + \frac{1}{C_{main}}\right)}}$$

which is indicated by reference 202 in FIG. 4. Because the frequency change, i.e. from $\omega_1$ to $\omega_2$, occurs when the energy stored in the modulating capacitor bank 122 is substantially equal to zero, and substantially all the energy in the antenna circuit 112 is stored in the magnetic field of the antenna coil 120, it will be appreciated that virtually no voltage transients will be introduced into the antenna circuit 112. As a result, the electromagnetic field emitted by the antenna coil 120 will be substantially jitter-free.

When the state of the data signal 99 received by the controller 140 changes from logic LOW to a logic HIGH, and the voltage detector 150 signals that the energy stored in the pump capacitor bank 123 is zero, the controller 140 issues control signals to outputs 151 and 152 to turn OFF the two MOSFET's 117a and 117b and thereby reconnect the modulating capacitor bank 122 to the antenna circuit 112. Again, at this point substantially all the energy in the antenna circuit 112 will be stored in the magnetic field of the antenna coil 120, Shortly after the modulating capacitor bank 122 is re-coupled, the resonant frequency of the antenna circuit 112 returns to $\omega_1$, As the re-coupled modulation capacitor 16 initially has no stored energy, and is coupled to the antenna circuit 112 when substantially all the energy is retained in the magnetic field of the antenna coil 120, it will be appreciated that virtually no voltage transients will be introduced into the antenna circuit 112 during this latter frequency change.

To replenish the energy loss in the antenna circuit 112 which occurs primarily due to power dissipation in the coil 120, the controller 140 intermittently couples the DC source 124 to the pump capacitor bank 123. It is a feature of this aspect of the invention that the DC source 124 is only coupled to the pump capacitor bank 123 in the antenna circuit 112 when the voltage drop across the pump capacitor 123 is at or near its maximum. This ensures that the energy transfer occurs as efficiently as possible.

The controller 140 uses the zero-crossing current detector 148 to monitor the pump capacitor 123. The current detector 34 continuously measures the current flowing in the antenna circuit 112. When the current is zero, the current detector 148 notifies the controller 140. In response, the controller 140 issues command signals to the respective driver circuits 142, 144 to couple the voltage source 24 to the pump capacitor bank 123. At this point, the voltage drop across the pump capacitor 123 will be at or near its maximum, and the energy stored in the pump capacitor 123 will also be at or near maximum.

According to this aspect of the invention, energy is supplied to the pump capacitor bank 123 in short pulses as follows. In response to a signal from the zero-current crossing detector 154, the controller 140 issues command signals on outputs 161 to 163 to turn ON the two MOSFET's 130a and 130c. In the conduction state, the MOSFET's 130a and 130c couple the DC source 124 across the pump capacitor bank 123 so that energy is transferred to the pump capacitor bank 123. The anode of the DC source 124 is coupled to terminal 129 of the pump capacitor 123 and the cathode is coupled to the other terminal 127 of the capacitor bank 123.

After a short predetermined interval (described below), the controller 140 turns OFF the two MOSFET's 130a and 130c thereby disconnecting the DC source 124 from the pump capacitor 123. At the next half oscillation of the current flowing in the antenna circuit 112, the voltage at terminal 127 in the pump capacitor bank 123 will be positive with respect to terminal 129. Accordingly, when the detector 148 detects that the current in the antenna circuit 112 is zero and notifies the controller 140, the controller 140 issues command signals on outputs 164 to 166 to turn ON the two MOSFET's 130b and 130d. Conduction of the MOSFET's 130b and 130d couples the anode of the DC source 124 to terminal 127 of the pump capacitor bank 123 and the cathode of the DC source 124 to the other terminal 129 of the bank 123. This causes energy to be transferred from the DC source 124 to the pump capacitor bank 123. Shortly thereafter, the controller 140 turns OFF the two MOSFET's 130b and 130d to isolate the DC source 124 from the antenna circuit 112.

It will be understood that the amount of energy transferred from the DC source 124 to the pump capacitor bank 123 during each half-cycle is proportional to the duration over which the DC source 124 is coupled to the pump capacitor bank 123. For the magnitude of the current flowing in the antenna circuit 112 to remain constant, the duration which the DC source 124 is coupled to the pump capacitor 123 is adjusted so that the energy delivered to the antenna circuit 12 over each interval is substantially equal to the energy lost by the antenna circuit 112 during. each half-cycle oscillation of the resonant current in the circuit 112. In other words, the DC source 124 is coupled to the antenna circuit 112 only long enough to replace the energy lost by the circuit 112. By adjusting the-pulse width (i.e. duration) of the pulses supplied to the pump capacitor 123, optimal operating efficiency can be achieved. Accordingly, the controller 140 preferably includes the capability to adjust the width of the pulses. For the example implementation described below, a pulse width adjustable over a range of 5 to 15 microseconds provides optimal operating efficiency for the transmitter.

Accordingly, the magnitude of the current $i_{coil}$ in the antenna circuit 112 can be controlled as follows: (1) by varying the voltage output of the DC source 124; (2) by varying the duration (i.e. pulse width) of the charging pulses applied to the pump capacitor bank 123; or (3) by changing the capacitance value of the pump capacitor bank 123. The selection of one of these techniques is a design choice and will depend on the specifications of the particular application as will be within the knowledge of one skilled in the art.

In one application of the FSK transmitter 100 according to the present invention, the antenna is 3.5 m square and approximately 10 cm deep. The windings for the antenna are made formed from 25 turns of #8 AWG wire (RW-90 or equivalent) which is wound onto a form in two layers. The resulting inductance of the antenna coil is 7.885 mH. The main tuning capacitor (121 in FIG. 3) comprises eight 3 uF/660 VAC metallized polypropylene capacitors connected in series, for a nominal value of 0.375 uF/5820 VAC (specified at 60 Hz). For reasons of efficiency and safety, the main capacitor is mounted on the antenna form. The modulating control or switching capacitor bank (122 in FIG. 3) comprises two 3 uF/660 VAC capacitors connected in parallel and yielding 6 uF/660 VAC. The pump capacitor bank (123 in FIG. 3) comprises two 8 uF/660 VAC capacitors connected in parallel and yielding 16 uF/660 VAC. The net capacitance for the antenna circuit is 0.3453 uF total and 0.3664 uF shifted (i.e. with modulating capacitor bank shorted out). The resonant frequency is 3050 Hz and the shifted frequency is 2950 Hz. During testing with 110 VDC power source (124 in FIG. 3), the antenna coil developed 24.5 Aac at about 3500 VAC, and a moment of 7500 Am$^2$. The dissipation was estimated to be 600 W. In comparison, the total power consumption was measured at 616 W. It will be appreciated that this represents an extremely high efficiency for these types of transmitters.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A frequency shift keying generator comprising:
   (a) a resonant circuit;
   (b) a reactive element;
   (c) a switch for coupling and decoupling said reactive element to and from said resonant circuit, said resonant circuit oscillating at a first frequency when said reactive element is coupled and said resonant circuit oscillating at a second frequency when said reactive element is uncoupled;
   (d) a power supply having an output port coupled to said resonant circuit, said power supply including means responsive to a control signal for enabling said output port for energizing said resonant circuit;
   (e) a detector coupled to said resonant circuit for detecting an energy level for said reactive element and producing an output signal indicative of said energy level; and
   (f) a controller for controlling said switch, said controller including an output port for actuating said switch and an input port coupled to said detector for receiving said energy level output signal, said controller also having a data input for receiving a data signal and means for selectively actuating said switch to shift the oscillation of said resonant circuit between said first and second frequencies in response to a change of state in the data signal, and said controller including means responsive to said energy level for synchronizing the actuation of said switch with the energy level in said reactive element.

2. The frequency shift keying generator as claimed in claim 1, further including a sensor coupled to said resonant circuit, said sensor including means for sensing current flow in said resonant circuit and means for generating an output signal indicative of the current flow, and said controller including means responsive to said current flow signal for generating an output signal to couple the output port of said power supply to said resonant circuit when the current flow is substantially zero, so that energy is injected into said resonant circuit when said output port is enabled.

3. The frequency shift keying generator as claimed in claim 1, wherein said detector comprises a voltage detector, said voltage detector having sensing means coupled to said resonant circuit for sensing voltage in said reactive element and including means responsive to the output of said sensing means for generating an output signal when the voltage level in said reactive element is substantially zero.

4. The frequency shift keying generator as claimed in claim 3, wherein said resonant circuit comprises a coil, a tuning capacitor and a pump capacitor, said tuning and pump capacitors being connected in series with said reactive element, and said coil being connected in parallel with said series connected capacitors and reactive element.

5. The frequency shift keying generator as claimed in claim 4, wherein said reactive element comprises a modulating capacitor, said switch being connected across said modulating capacitor so that when said switch is actuated by said controller said modulating capacitor is disconnected from said resonant circuit.

6. The frequency shift keying generator as claimed in claim 2, wherein said means for sensing current flow comprises a coil electromagnetically coupled to said resonant circuit and said means for generating an output signal indicative of the current flow comprises a zero crossing current detector circuit.

7. The frequency shift keying generator as claimed in claim 2, wherein said power supply comprises a DC power source having a positive output terminal and a negative terminal and said means for enabling comprises a switching network coupled to said positive and negative terminals and said switching network being responsive to the control signal from said controller for selectively switching and reversing the polarity of the output voltage applied to said resonant circuit.

8. A frequency shift keying generator comprising:
   (a) a resonant circuit;
   (b) a reactive element;
   (c) a switch for coupling and decoupling said reactive element to and from said resonant circuit, said resonant circuit oscillating at a first frequency when said reactive element is coupled and said resonant circuit oscillating at a second frequency when said reactive element is uncoupled;
   (d) a power supply having an output port coupled to said resonant circuit, said power supply including means responsive to a control signal for enabling said output port for energizing said resonant circuit;
   (e) a sensor coupled to said resonant circuit, said sensor including means for sensing current flow in said resonant circuit and means for generating an output signal indicative of the current flow;
   (f) a controller for controlling said switch, said controller including an output port for actuating said switch and a data input for receiving a data signal and means for selectively actuating said switch to shift the oscillation of said resonant circuit between said first and second frequencies in response to a change of state in the data signal, and said controller including means responsive to said current flow signal for generating said control signal for enabling said output port and coupling said power supply to said resonant circuit for a predetermined duration when the current flow is substantially zero, so that energy is injected into said resonant circuit when said output port is enabled.

9. A method for producing frequency shift keying in an oscillating carrier signal, the oscillating carrier signal being generated by a resonant circuit having a modulating capacitor and a switch for selectively coupling and decoupling the capacitor to the resonant circuit, said method comprising the steps of:
   (a) generating the oscillating carrier signal at a given frequency;
   (b) receiving a binary data signal comprising a sequence of binary states;
   (c) monitoring the energy level in the modulating capacitor;
   (d) introducing a shift in the frequency of said oscillating carrier signal when there is a change in the binary state of the data signal;
   (e) wherein said step of introducing a frequency shift comprises selectively coupling the modulating capacitor to the resonant circuit and wherein said step, of coupling is synchronized to the monitored energy level in the modulating capacitor.

10. The method as claimed in claim 9, further including the step of supplying high voltage pulses to replenish energy losses in the resonant circuit, said step of supplying high voltage pulses comprises monitoring current flow in the resonant circuit and injecting said high voltage pulses when the current flow is substantially zero.

11. The method as claimed in claim 10, wherein said step of supplying high voltage pulses includes coupling the output of a DC source to the resonant circuit and alternating the polarity of the voltage pulses applied to the resonant circuit.

12. The method as claimed in claim 11, wherein the high voltage pulses have a duration in the range of 5 to 15 microseconds.

* * * * *